United States Patent [19]

Kampfer

[11] 3,776,349
[45] Dec. 4, 1973

[54] FABRICATED FLEXIBLE CONVEYOR CHAIN

[75] Inventor: Richard H. Kampfer, St. Paul, Minn.

[73] Assignee: Conveyor Specialties Company, St. Paul, Minn.

[22] Filed: June 25, 1969

[21] Appl. No.: 836,358

[52] U.S. Cl. .............................. 198/195, 198/189
[51] Int. Cl. .......................................... B65g 17/06
[58] Field of Search ................... 198/181, 189, 195, 198/202

[56] References Cited
UNITED STATES PATENTS

| | | |
|---|---|---|
| 2,579,410 | 12/1951 | Zanitis ............................. 198/189 |
| 3,512,627 | 5/1970 | Hodlewsky et al. ............... 198/189 |
| 3,513,964 | 5/1970 | Imse ................................. 198/195 |
| 3,529,715 | 9/1970 | Mueller ............................ 198/189 |

Primary Examiner—Evon C. Blunk
Assistant Examiner—James L. Rowland
Attorney—Frank B. Hill

[57] ABSTRACT

A fabricated flexible conveyor chain is provided from solid construction which can be made from a single piece of metallic material or can be made from separate sheets of material permitting different types of materials to form a completed link units, including the advantage of having negative draft rib members to give guiding and controlling surfaces permitting the chain unit to travel around small diameter curves.

1 Claim, 14 Drawing Figures

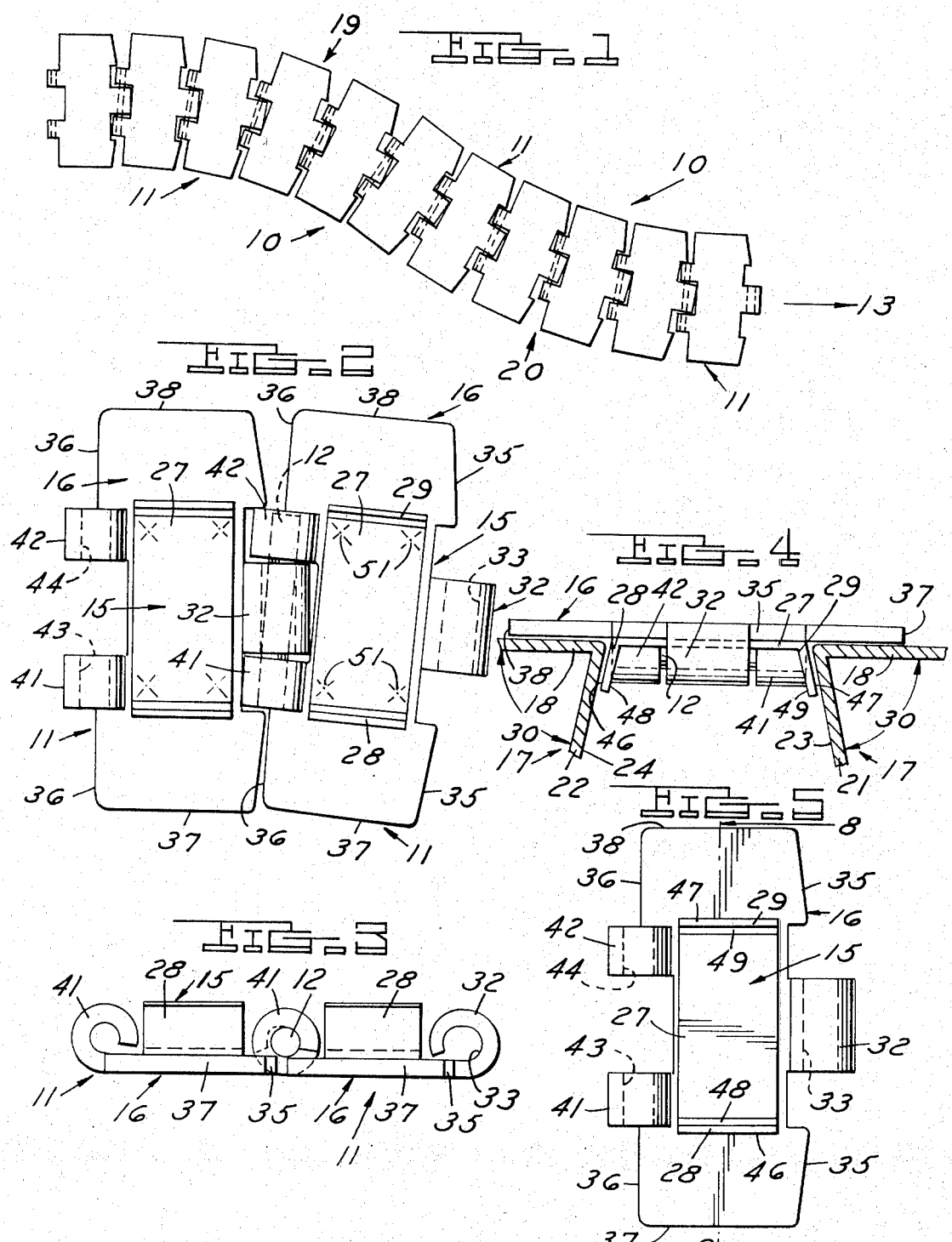

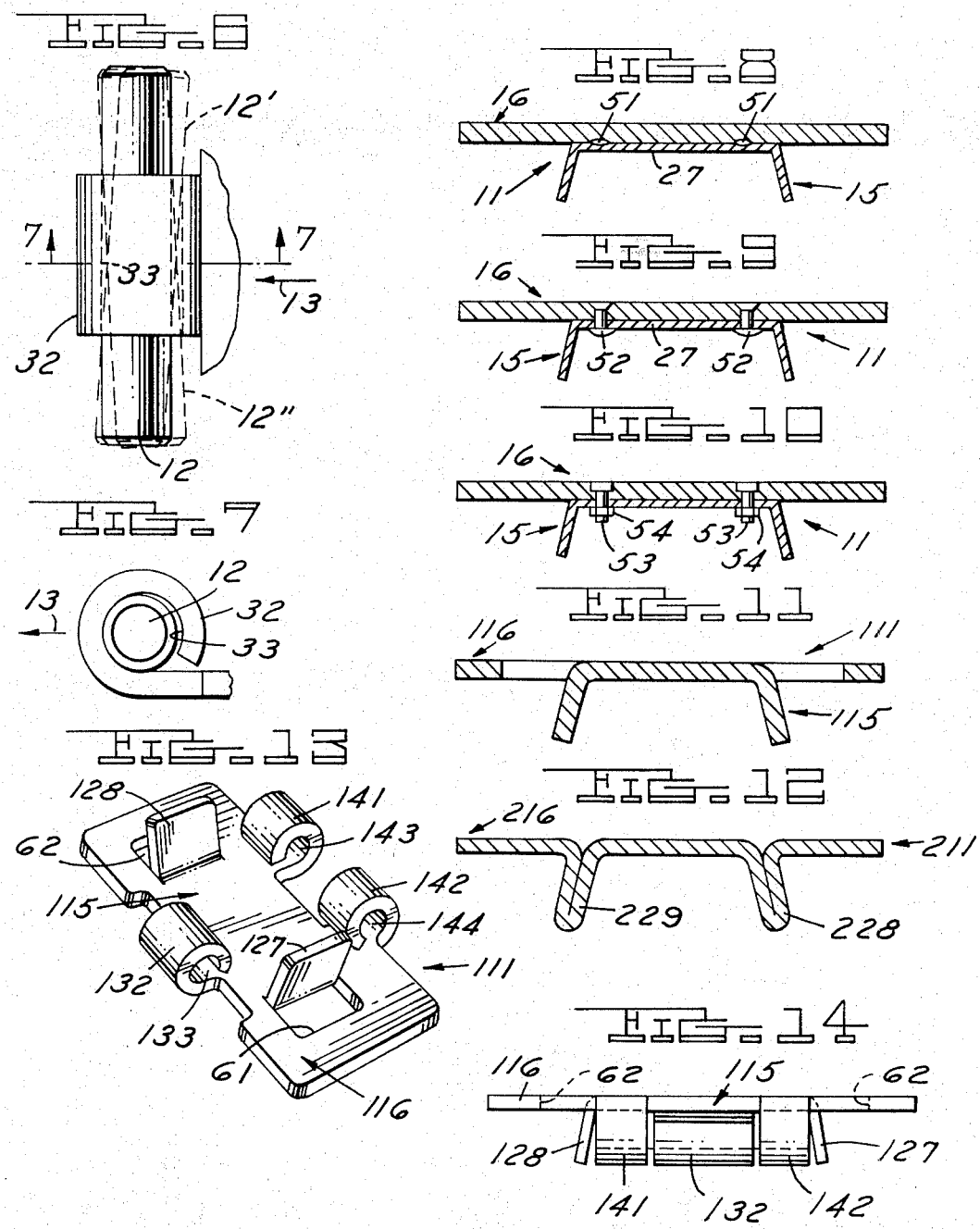

FABRICATED FLEXIBLE CONVEYOR CHAIN

This invention relates generally to an improved flexible conveyor chain and in more specific applications to a metal fabricated flexible conveyor chain which can be made inexpensively by having a single piece ramp link guide system with either an attached top platform or an inherent top platform.

It has been found through actual test and production conditions that the ramp portion of individual chain link units having a negative draft will permit chains to carry loads around corners having relatively small radii distances.

Plastic chains with specialized and specific field application have been used such as those illustrated in the present inventor's prior patents such as United States Letters Patent No. 3,262,550 which was issued July 26, 1966, and United States Letters Patent No. 3,279,586 which was issued Oct. 18, 1966. It has been apparent that metal chains having the advantages of these features but yet being inexpensive to manufacture and easily fabricated, can provide useful application in the industrial marketplace.

It is therefore an object of the present invention to provide a conveyor belt link unit having a negative draft ramp member which can be made from inexpensive, easily fabricated metal sheets which can be formed by punch press type operations.

Another object of the present invention is to provide a ramp member of easily formed metallic substance which may be attached to a platform member of another type material permitting the conveyor chain formed from the individual link units to pass around small radii curves not permitted by prior conveyor chain assemblies and giving a wide range of advantages because of the bi-material characteristics.

Also another object of the present invention includes the provision of a conveyor chain assembly being formed from link units having negative draft ramp members capable of accomplishing the above objectives with a minimum of material cost and fabricating expense and at the same time being composed of a simple, reliable and ruggedly formed structure which is especially reliable and accurate in application.

Another object and advantage of the present invention will be apparent from the following detailed description and claims taken in connection with the accompanying drawings which form part of the instant specification in which are to be read in conjunction therewith, and therein like reference numerals are used to indicate like parts in the various views.

In the drawings:

FIG. 1 is a top plan view illustrating the flexible characteristic of a conveyor chain belt section having link units with a negative draft and utilizing the principles of the present invention.

FIG. 2 is a bottom plan view of two individual link units of the conveyor chain belt section shown in FIG. 1 and connected together by a pivot pin and illustrating the principles of the present invention.

FIG. 3 is an inverted side view illustrating the two links assembled together by a pivot pin similar to the construction illustrated in FIG. 2 and illustrating the principles of the present invention.

FIG. 4 is a rear view of a link unit similar to those illustrated in FIGS. 1, 2 and 3 and being supported by support surfaces and showing relationship of guide surfaces on both sides of the link unit acting in conjunction with the outer surfaces of the negative draft rib guides of the ramp member and illustrating the principles of the present invention.

FIG. 5 is a bottom plan view illustrating a single link unit of a conveyor chain belt in independent form showing the principles of one embodiment of the present invention similar to the link units illustrated in FIGS. 1, 2, 3 and 4.

FIG. 6 is an enlarged partial sectional view illustrating the movement of a pivot pin, similar to FIG. 2, in a central portion of the lead edge of the link unit of a conveyor chain belt and illustrating the principles of the present invention.

FIG. 7 is an enlarged side view of the action between the central portion of a link unit of the conveyor chain belt and the pivot pin of the conveyor chain assembly taken generally along line 7—7 of FIG. 6.

FIG. 8 is a partial cross-sectional view illustrating the principles of the present invention in the form of a ramp member welded to a platform member forming a link unit and taken generally along line 8—8 of FIG. 5.

FIG. 9 is a partial cross-sectional view similar to FIG. 8 illustrating the ramp member secured to the platform member by rivet connecting means forming a link unit.

FIG. 10 is a partial cross-sectional view similar to FIG. 8 illustrating the ramp member secured to the platform by a nut and bolt securing means forming a link unit.

FIG. 11 is a partial cross-sectional view similar to FIG. 8 illustrating a unitary solid single piece construction of a metallic member showing the ramp member and the platform member as one inherent structure forming a link unit.

FIG. 12 is a partial cross-sectional view similar to FIG. 8 illustrating a single unitary platform and ramp member made from metallic material forming a link unit by being bent into form.

FIG. 13 is a perspective view of one preferred embodiment, such as shown in FIG. 11, illustrating a single unitary link unit having the negative draft rib guide portions punched from the platform portion of the link unit and the side projections at the trailing side of the link unit rolled from the solid sheet and the front edge central portion rolled from the solid original sheet coplanar with the platform portion of the link unit.

FIG. 14 is an end view of a single link unit in its upright position similar to the embodiment illustrated in FIG. 13 and looking in the direction of the path of travel.

Referring to FIGS. 1 – 5 there is illustrated a conveyor chain belt section generally referred to by the numeral 10 which is made up of various link units 11. The link units 11 are joined together by pivot pins 12, their full purpose and function will be explained in more detail below. In normal operation the conveyor chain section 10 will move in a path of travel as indicated by directional arrow 13, as best viewed in FIG. 1. The link units 11, as illustrated in FIG. 2, are made up of two general components; namely, a ramp member 15 and a platform member 16.

When the conveyor chain section 10 is moving in a straight line path of travel normally it will be held by guide bars 17. The guide bars 17 have support surfaces 18 which will act on both sides of the guide platform member 16 of the link unit 11 and support it along its path of travel. When the conveyor chain section 10 makes a right turn, for example, generally indicated by arrow 19 in FIG. 1 and a left turn generally, for example, indicated by arrow 20 in FIG. 1, the guide bars 17 will have guide rails 21 and 22 formed below their support surface to facilitate such turns as will be explained below in more detail.

As best viewed in FIG. 4, guard rails 21 and 22 are illustrated and have guide surfaces 23 and 24, respectively. FIG. 4 is an end view showing a link unit 11 looking in the direction of travel as indicated by directional arrow 13 in FIG. 1. Therefore, when the conveyor chain section 10 is moved in a right turn pattern such as indicated by arrow 19 and illustrated in FIG. 1, the guide support surface 18 on the right side as seen in FIG. 4 will have a guide rail 21 which will act on the ramp member 15 of the link unit 11, as will be explained in more detail below. The guide rail 21 will control the path movement of the link unit 11 by holding it in a down direction and guiding it around the curve. When the conveyor chain section 10 makes a left turn such as indicated by arrow 20 and illustrated in FIG. 1, the guide surface 18 on the left side, as seen in FIG. 4, will then have a guide rail 22 which will hold the link unit 11 in a down position and guide it around the turn. The full function of these functions will be explained in more detail below.

The ramp member 15, as best viewed in FIG. 2, has a ramp body 27 and guide ribs 28 and 29. The rib guides 28 and 29 will form negative draft angles with respect to the platform member 16, and this angle is generally indicated by numeral 30 in FIG. 4. The platform member 16 has a leading member which is generally referred to and indicated as central portion 32. The central portion 32 is provided with a central opening 33. The central opening 33 is oblong in shape and can be best viewed in FIGS. 3 and 7. Its full function and purpose will be explained in more detail below.

Referring generally to FIG. 2, the platform member 16 has an angled front edge 35 and a trailing straight edge 36. These edges 35 and 36 are connected by side edges 37 and 38. The angled edge 35 permits the link units 11 of the conveyor chain section 10 to make the various right and left turns, such as those illustrated by arrows 19 and 20 in FIG. 1, without coming in contact with the straight edge 36 of the leading link unit 11 which they are adjacent to.

The platform member 16 has side projections 41 and 42 which have pin bores 43 and 44, respectively. The axis of the pin bores 43 and 44 are aligned with each other and their axis would form a plane with the straight edge 36 which is substantially perpendicular to the platform member 16. The pivot pin 12 is mounted in the pin bores 43 and 44 of the side projections 41 and 42 in a press fit manner or in a secured manner so that the pivot pin will not slide out of the pin bores. Thus, the pin bores 43 and 44 are substantially the same diameter as the ends of pivot pin 12.

The side projections 41 and 42 have the central portion 32 of the trailing link unit 11 positioned between them, and the central opening 33 permits the pivot pin 12 to pass through it. The oval opening form of the central opening 33 permits the pivot pin 12 to move freely within the central opening 33 so that as the conveyor chain section 10 is moving around right and left turns it can twist one link unit independent of the other link as will be determined by the various guide rails 21 and 22 of the guide bars 17. When the conveyor chain section 10 goes into a turn, for example, a right turn as illustrated substantially by arrow 19, only the guide bar 17 on the right side as viewed in FIG. 4 having a guide rail 21 with its guide surface 23 would be necessary. When the conveyor chain section 10 would go into a left turn, as illustrated by arrow 20 of FIG. 1, the guide bar 17 on the left side as viewed in FIG. 4 having a guide rail 22 would then appear along with its guide surface 24.

The ramp guides 28 and 29 of the ramp member 15 are provided with outside surfaces 46 and 47, respectively, and with inner surfaces 48 and 49, respectively. The ramp member 15 can be made from steel sheets which can be formed into shape by a punch press operation, for example. In the present illustration the platform member 16 and the ramp member 15 could be secured together by spot welds 51.

When the link unit 11 is moved on the support surface 18 toward the guide rail 21, for example, the outer surface 47 will come into contact with the guide surface 23 and due to the negative draft angle 30, the link unit 11 will tend to move the platform member 16 down into further contact with the right support surface 18 as viewed in FIG. 4. At the same time, the guide surface 23 will be in a right circular turn path. This will cause the link member 11 to travel in that path. When the link unit 11, being supported by support surface 18, is moved to the left in the direction of guide rail 22, the outer surface 46 will be moved into contact with guide surface 24. And, at this time, the same reaction will happen similar to that explained above because of the negative draft angle 30 causing the platform member 16 to tend to move down and the curvature of the guide surface 24 will require the link unit 11 to travel in the left turn path that it dictates. The central opening 33 permits the pivot pin 12 to pivot in it so that each individual link unit 11 can adjust to the turns in a free manner without any danger of binding taking place between the link units.

The platform member 16 can also be made from materials such as steel where the central portion 32 and the side portions 41 and 42 can be made in punch press type operations thus giving an easily and inexpensively formed link unit from readily available materials and utilization of standard manufacturing techniques with a rigid sturdy construction being provided.

Referring generally to FIG. 6, th direction of travel is indicated by arrow 13, the movement of pivot pin's 12 rotation in the central opening 33 as illustrated when moving forward in a standard operating direction. The pivot pin 12 is illustrated in a normal straight forward portion by solid lines. When the conveyor chain section 10 would be making a right turn, as illustrated by arrow 19 in FIG. 1, for example, then the pivot pin 12 will move to the position shown by dotted lines in phantom and indicated generally by numeral 12. When the conveyor chain section 10 moves in a left turn direction, as illustrated by arrow 20 of FIG. 1, for example, the pivot pin 12 then moves to a position shown by dotted lines in phantom and indicated generally by numeral 12.

FIG. 7 is an enlarged cross-sectional view taken generally along line 7—7 of FIG. 6 and shows the position of the pivot pin 12 in the central opening 33 of the central portion 33 when the conveyor chain section 10 is moving in a straight directional path. It is shown in this view that the oblong form of central opening 33 permits the pivoting movement of the pivot pin 12.

FIG. 8 is a partial cross-sectional view of a link unit 11 having spot welds 51 holding the platform member 16 and the ramp member 15 in assembled position, and illustrates the link unit 11 shown in FIGS. 2, 3, 4 and 5.

FIGS. 9–12 illustrate other embodiments of forming and securing the elements to form a link unit 11. The platform member 16 and the ramp member 15 can be secured together by rivets 52 as illustrated in FIG. 9. This would permit securing together other than metallic or weldable parts such as illustrated in FIG. 8. In other words, we could put similar materials together or we could rivet dissimilar materials together such as a metal ramp member and a plastic platform member or a wooden platform member, for examples.

FIG. 10 illustrates the ramp member 15 and the platform member 16 being secured together by bolts 53 and nuts 54.

FIG. 11 illustrates a unitary single piece link 111 which has a platform portion 116 and a ramp portion 115. The full structure of the single piece link 111 is illustrated in FIGS. 13 and 14 and they will be discussed in more detail below.

FIG. 12 illustrates a formed single piece link 211 where the ramp guides 228 and 229 will be formed from the same material and the platform portion 216 portion and the side projections is a combination of and similar to the platform member 16 and the ramp member 15 in the same functioning manner link unit 111 is a single unit. The central portion 32 and the side projections for the formed single piece link 211 could be similar to the corresponding units of the single piece link 111, the full function of which will be explained in more detail below.

Referring to FIGS. 11, 13 and 14 for the solid single piece link unit 111, as illustrated, the platform portion 116 and the ramp portion 115 are inherent with one another and the ramp guides 127 and 128 are punched out of the link unit 111 when it is in a flat form, leaving rib openings 61 and 62. Central portion 132 is formed similar to the central portion 32 and it has a central opening 133 which is elongated similar to central portion 33. The central portion 132 would be the leading edge of the link unit 111. At the rear of the link unit 111 there is provided side projections 141 and 142 which have pin bores 144 and 143 and these are similar and function the same as side projections 41 and 42. FIG. 14 is a view looking from the back of the link unit 111, from the side projections 141 and 142, forward, toward the central portion 132. This link unit 111 will function in conveyor chain section in the same manner which was explained above for the link unit 11 and will act on the guide bars 17 in a similar manner.

In the preferred embodiment of this invention, the central portion and the side projections would be formed with the platform member. However, there may be occassions when it would be desired that the central portion and the side projections be inherent with and part of the ramp member. The link unit 111, of course, is a combination providing a link unit made of the same material and formed as a single unit with the platform portion and the ramp portion being a single unit and having the central portion and the side projections inherent with it.

While several forms of the invention have been shown and described, other forms within the scope of the invention will now be apparent to those skilled in the art. Therefore, the embodiments shown in the drawings are to be considered as merely set forth for illustrative pusposes, and is not intended to limit the scope of the invention herein described and shown. Also directional terms such as "top," "bottom," "front," "back," "vertical" et cetera have been used to facilitate explaining the invention in the position shown in the drawings and are not to be considered as limiting the invention.

Other modes of applying the principle of my invention may be employed, instead of those explained, change being made as regards the articles and combinations herein disclosed, provided the means and features stated or the equivalent of such stated means and features be employed.

I therefore particularly point out and distinctly claim as my invention:

1. A conveyor chain link unit being capable of connection by pivot pins comprising, in combination:
   a. said link unit having a ramp member and a platform member;
   b. said platform member having a first and second pin receiving means;
   c. said first pin receiving means being positioned substantially at the center of a first edge of said platform member and having a central opening;
   d. said central opening being larger in area than the said pivot pin it will receive;
   e. said second pin receiving means having two side projections being positioned on substantially opposite sides of the center of a second edge of said platform member and having pin bores;
   f. said pin bores having an area substantially the same size as the said pivot pin it will receive;
   g. said side projections being separated more than the width of said first pin receiving means;
   h. first and second ramp guides as part of said ramp member;
   i. said ramp guides positioned between the first and second edge of said platform member and separated from each other a greater distance than the outside edges of said side projection;
   j. said ramp guides forming an acute angle with said platform member;
   k. said ramp member and said platform member are inherent with each other and formed from a single piece of material;
   l. said first and second guide means are formed by folding said single piece of material forming a double thickness of material;
   m. the said guide means will extend the length of said link unit; and
   n. the ends of said platform members will extend beyond said guide means.

* * * * *